United States Patent Office 3,203,094
Patented Aug. 31, 1965

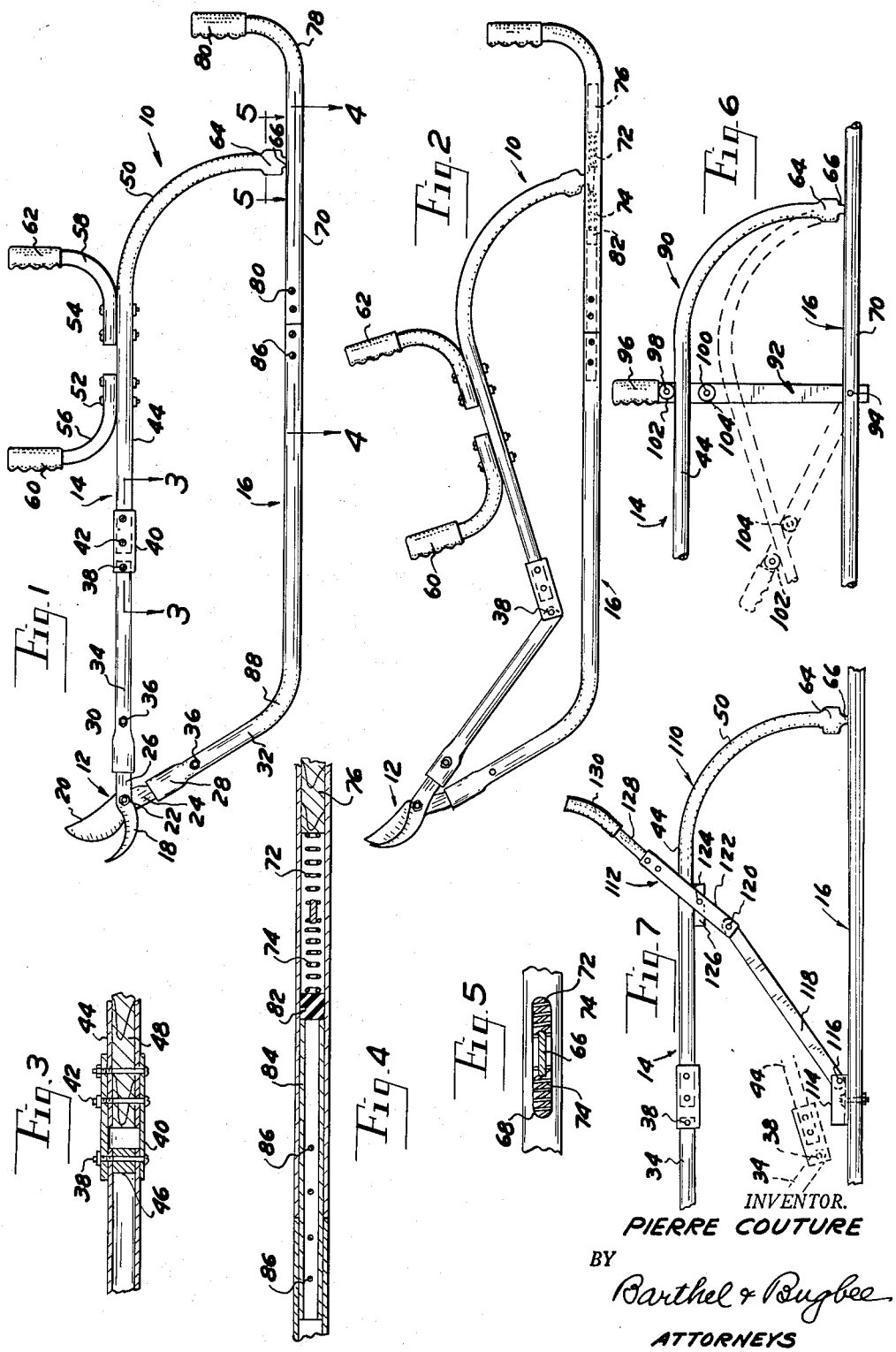

3,203,094
PRUNING APPLIANCE
Pierre Couture, 23031 Donaldson, Dearborn, Mich.
Filed Jan. 17, 1963, Ser. No. 252,233
2 Claims. (Cl. 30—250)

This invention relates to tree pruning shears.

Hitherto, it has been difficult and uncomfortable as well as sometimes dangerous to prune or trim the lower branches of small trees or bushes, because of the difficulty of reaching these branches and of the consequent scratches sustained by the workman performing the pruning. This has been especially serious in pruning or trimming the lower branches of Christmas trees because such trees are ordinarily planted as seedlings in shallow trenches or ditches about four inches deep, so as to concentrate the moisture and protect the seedlings during their early growth. Although the lower branches of the trees growing from such seedlings are inaccessible and difficult to reach for pruning, it is nevertheless advisable to remove them because they detract from the value of the tree and are also in the way of the user when he mounts the tree.

The prior method of removing these lower branches has been by the use of hand pruning shears, with the workman wearing long rubber gloves extending beyond his elbows. In spite of this protection to his hands and arms, however, his face becomes scratched by the pine needles so that at the end of a day's work, his face is covered with scratches, some of which occasionally become infected. The workman in using such hand pruning shears in trimming the lower branches of Christmas trees, has also been obliged to kneel on the ground in an uncomfortable position in order to reach such lower branches.

The present invention enables the pruning of these lower branches of trees and bushes by an operator located a sufficient distance from the tree or bush to avoid these prior disadvantages, and also enabling him to operate the device from a standing position.

Accordingly, one object of this invention is to provide a pruning appliance for removing branches at or near the ground level while enabling the operator to stand upright at a sufficient distance from the tree or bush to avoid injurious contact therewith, yet enabling him to exert accurate positioning and full control of the cutting blades or shears while so standing.

Another object is to provide a pruning appliance of the foregoing character wherein a powerful mechanical advantage is exerted upon the cutting jaws or blades constituting the pruning shears, thereby enabling the cutting of larger-diameter branches than would otherwise be feasible.

Another object is to provide a pruning appliance of the foregoing character which is operated either by pushing or pulling one handle relatively to another or, in a modified form, by swinging one handle arcuately relatively to the other in order to operate the cutting jaws or blades constituting the cutting shears.

Other objects and advantages of the invention will become apparent during the course of the following description of the accompanying drawing, wherein:

FIGURE 1 is a side elevation of a pruning appliance, according to one form of the invention, shown in its operating position with the cutting jaws or blades open;

FIGURE 2 is a side elevation similar to FIGURE 1, but with the cutting jaws or blades in their closed positions;

FIGURE 3 is a longitudinal section taken along the line 3—3 in FIGURE 1;

FIGURE 4 is a longitudinal section taken along the line 4—4 in FIGURE 1;

FIGURE 5 is a cross-section, partly in top plan view, taken along the line 5—5 in FIGURE 1;

FIGURE 6 is a fragmentary side elevation of the rearward portion of a first modification of the pruning appliance shown in FIGURES 1 to 5 inclusive; and FIGURE 7 is a fragmentary side elevation of the rearward portion of a second modification of the pruning appliance shown in FIGURES 1 to 5 inclusive.

Referring to the drawing in detail, FIGURES 1 to 5 inclusive show a pruning appliance, generally designated 10, according to one form of the invention as including generally shears 12 operated by a movable power-applying elbow lever 14 and a bent stationary appliance-positioning member 16 on the manner described below. The shears 12 consist of sharp-edged movable and stationary cutting jaws or blades 18 and 20 respectively pivoted to one another by the pivot bolt 22 and terminating in extensions 24 and 26 secured in the flattened lower ends 28 and 30 of the tubular lower portions or arms 32 and 34 by fasteners 36, such as rivets or bolts. The upper end of the lower arm 34 of the power-applying elbow lever 14 is pivoted at a pivot joint or pivot bolt 38 to a coupling sleeve 40, the opposite end of which is secured as by bolts or other fasteners 42 to the lower end of the upper tubular arm 44 of the elbow lever 14. In order to strengthen the connection within the coupling sleeve 40, spacing liners 46 and 48 are mounted therein and held in place by the bolts 38 and 42 respectively (FIGURE 3).

The liner 48 continues through the interior of the tubular upper elbow lever arm 44, terminating immediately prior to an arcuate 90 degree bend 50 therein. There it is held in position by bolts 52 and 54 which respectively secure tubular arcuate right-angled handle shafts 56 and 58 which in turn carry lower and upper movable handles 60 and 62 respectively. The handles 60 and 62 are preferably made of material molded to the configuration of the palm and fingers of the hand and preferably made of elastomeric or synthetic plastic material. The upper elbow lever arm 44 terminates in a flattened end portion 64 having a tongue 66 (FIGURE 5) which fits into a slot 68 in the upper tubular portion 70 of the stationary member 16, which is disposed at an obtuse angle to the lower portion 32 thereof. The tongue 66 is disposed between compression springs 72 and 74 (FIGURES 4 and 5) in such a manner as to be yieldably mounted and urged toward its central position shown in FIGURE 4. The upper spring 72 is backed by an abutment liner 76 disposed within the upper tubular portion 70, the upper end of which is prevented from upward motion by the right-angled arcuate bend 78 (FIGURE 1) carrying it at its upper end a stationary handle 80 similar to the inner handles 60 and 62.

The lower spring 74 backs up against an abutment 82 of rubber, synthetic plastic or the like which in turn abuts the upper end of a tubular liner 84. The liner 84 spans the joints between the upper and lower portions 70 and 32 of the stationary appliance-positioning member 16 (FIGURE 4) in telescoping relationship and is secured thereto by fasteners 86, such as bolts or rivets. The lower portion 32 is provided with an obtuse-angled approximately 120° arcuate bend or fulcrum portion 88 located at a slightly shorter distance from the pivot bolt 22 than the pivot 38 on the upper end of the component 34.

In the operation of the pruning appliance 10 of FIGURES 1 to 5 inclusive, let it be assumed that the working parts are in the relative positions shown in FIGURE 1, with the power-applying elbow lever 14 and stationary appliance-positioning member 16 occupying approximately the shape of a greatly elongated rhomboid. In this position the sharp-edged cutting blades 18 and 20 are spread apart from one another in the open position of the shears 12. Holding the stationary handle 80 in one hand and either the movable handle 60 or 62—whichever is the more convenient—in the other hand, the operator while in a standing position positions the lower arm 32 of the stationary member 16 at or near the ground level with the upper arm 70 inclined upwardly while he rests the fulcrum portion 88 of the stationary appliance-positioning member 16 on the ground and slides it forward along the ground so as to position the shears 12 downward and forward beneath the tree to be pruned. He then swings the upper portion 70 downward to swing the lower portion 32 upward around the fulcrum portion 88 as a pivot so as to cause the cutting blades 18 and 20 to receive between them the butt end of the branch to be cut, at or near its junction with the trunk of the tree.

When he feels the branch firmly seated between the cutting blades 18 and 20, he pushes sharply downward and forward upon the movable handle 60 or 62 while firmly holding the stationary handle 80 in its previous position. This action bends or "breaks" the power-applying elbow lever 14 in a downward direction toward the stationary appliance-positioning member 16 in the manner shown in FIGURE 2, with the lower elbow lever arm 34 swinging downwardly toward the lower arm 32 of the stationary holding member 16 around the pivot bolt 22 as a fulcrum, thus assuming an obtuse angle relatively to the upper elbow lever arm 44, and thereby closing the cutting blades 18 and 20 of the shears 12 upon the branch and severing the branch from the tree trunk by the consequent shearing action. As this occurs, the tongue 66 on the upper end 64 of the upper elbow lever arm 42 of the elbow lever 14 is pushed upward in the slot 68, compressing the upper spring 72 against the liner 76 (FIGURE 2). By pulling upward upon the selected handle 60 or 62 with one hand while holding fast upon the handle 80 with the other hand, the operator then opens the cutting blades 18 and 20, and returns the various components to their rhomboidal arrangement shown in FIGURE 1, ready to resume the pruning operations on the next branch.

In this manner, the operator is enabled to maintain an upright posture and to quickly and accurately position and actuate the blades 18 and 20 while he remains out of reach of the sharp-pointed needles and branches of the trees, and out of contact with the water, mud or snow which is so often on the ground. He also avoids the tedious and painful manipulations occasioned by the use of hand shears and from his higher vantage point away from the tree is enabled to inspect the results of his work more accurately and thus to perform a better job of pruning.

The modified pruning appliance, generally designated 90, shown in FIGURE 6 is similar for the most part to the pruning appliance 10 shown in FIGURES 1 to 5 inclusive, especially as regards the lower end of the device adjacent the shears 12, which are therefore omitted to conserve space. The upper lever arm 44 of the elbow lever 14 is swung downward and outward toward the stationary member 16 in a different manner and by a different construction, in order to bend or "break" the power-applying elbow lever 14 at the pivot 38 between the upper and lower elbow lever arms 44 and 34 in closing the cutting blades 18 and 20 of the shears 12. To accomplish this, there is provided in FIGURE 6 an operating lever 92, the lower end of which is pivoted as by the pivot bolt 94 to the upper portion 70 of the stationary member 16 while on its upper end is mounted a handle 96. Immediately below the handle 96 on opposite sides of the elbow lever arm 44 are mounted spaced parallel roller shafts 98 and 100 carrying opposing rollers 102 and 104 respectively.

In the operation of the modified pruning appliance 90, the operator holds the handle 80 (not shown) of the stationary member 16 in one hand as before, with the operating lever 92 disposed approximately perpendicular to the stationary member 16, as shown by the solid lines in FIGURE 6. As before, he positions the cutting blades 18 and 20 of the shears 12 beneath the tree to be pruned and on opposite sides of the branch to be severed, adjacent its junction with the tree trunk. He then closes the cutting blades 18 and 20 of the shears 12 upon the tree branch by pushing downward and forward on the handle 96, thereby swinging the operating lever 92 downward and forward into the dotted line position shown in FIGURE 6. This action bends or "breaks" the elbow lever 14 in a manner similar to that shown in FIGURE 2 and at the same time closes the blades 18 and 20 upon the branch, severing the branch, as before, by the shearing action of the blades 18 and 20.

The advantages of the modified pruning appliance 90 are similar to those set forth above for the pruning appliance 10 and hence need not be repeated. In addition, the operating lever 92 provides a convenience of manipulation and a somewhat greater leverage and consequently mechanical advantage than the mechanical advantage achieved by directly pushing upon the selected handle 60 or 62 as in the pruning appliance 10.

The further modified pruning appliance, generally designated 110, shown in FIGURE 7 is also similar for the most part to the pruning appliances 10 and 90 shown in FIGURES 1 and 6 respectively, and differs in the means by which the elbow lever 14 is bent or flexed. This is accomplished by an operating lever device, generally designated 112, which operatively connects the upper component 44 of the elbow lever 14 to the stationary member 16. Bolted or otherwise secured to the stationary member 16 is a bracket 114 which in turn carries a pivot bolt or pin 116 by which the lower end of a link 118 is pivotally connected to the bracket 114. The upper end of the link 118 is pivoted as at 120 to the lower end of an operating lever 122 which is pivoted intermediate its upper and lower ends to a pivot pin or bolt 124 carried by a bracket 126 bolted, welded or otherwise secured to the upper component 144 of the elbow lever 14 at a location spaced away from the pivot 38 of the latter. Bolted or otherwise secured to the upper end of the operating lever 122 is an extension 128 carrying the handle 130 similar to the handles 62 and 96 previously described.

In the operation of the modified pruning appliance 110, the operator holds the handle 80 (not shown) of the stationary member 16 in one hand, as before, and with the operating lever 122 disposed in approximate alignment with the link 118. As before, he positions the cutting blades 18 and 20 of the shears 12 beneath the tree to be pruned and on opposite sides of the branch to be severed, adjacent its junction with the tree trunk. He then closes the cutting blades 8 and 20 of the shears 12 upon the tree branch by pushing downward and forward on the handle 130, thereby swinging the operating lever 122 downward and forward toward the elbow lever pivot 38, bending or flexing the elbow lever 14 into the dotted line position shown fragmentarily in the lower left-hand corner of FIGURE 7, severing the tree branch, as before, by the shearing action of the blades 18 and 20.

The advantages of the modified pruning appliance 110 are similar to those set forth above for the pruning appliances 10 and 90 and, in addition, a greater leverage and consequent mechanical advantage are obtainable by the operating lever device 112.

What I claim is:
1. A lower branch tree pruning appliance, comprising
   a stationary cutting blade,
   a movable cutting blade,
   a pivot element pivotally interconnecting said blades;
   an elongated bent stationary appliance-positioning member having a lower portion with a length a multiplicity of times the length of said stationary blade secured to and extending downwardly from said stationary blade and having an upper portion with a length a plurality of times the length of said lower portion disposed at an obtuse angle to said lower portion in rigidly-connected relationship therewith and having a bent fulcrum portion at the junction therebetween, an elongated movable power-applying elbow lever secured to and extending upwardly from said movable blade, said power-applying elbow lever including a lower arm secured at its lower end to said movable blade and an upper arm pivoted at its lower end to the upper end of said lower arm and having a movable connection at its upper end to said stationary member;

and a power-applying elbow lever operating device including an operating member engaging and flexing said elbow lever arms relatively to one another around their common pivot whereby to move said cutting blades into shearing relationship relatively to one another.

2. A pruning appliance, according to claim 1, wherein said power-applying elbow lever and said stationary appliance-positioning member are disposed in approximately spaced parallel relationship in the open position of said cutting blades.

References Cited by the Examiner

UNITED STATES PATENTS

| | | | |
|---|---|---|---|
| 55,043 | 5/66 | Baumann | 30—249 |
| 122,753 | 1/72 | Beigh et al. | 30—249 |
| 483,928 | 10/92 | Kern | 30—246 |
| 576,989 | 2/97 | Barling | 30—250 |
| 785,109 | 3/05 | King | 30—249 |
| 1,227,678 | 5/17 | Scott | 30—250 |
| 2,550,874 | 5/51 | Skoog | 30—190 |
| 2,994,954 | 8/61 | Thompson | 30—251 X |

FOREIGN PATENTS

| | | |
|---|---|---|
| 426,649 | 5/11 | France. |
| 2,758 | AD 1893 | Great Britain. |

WILLIAM FELDMAN, *Primary Examiner*.

MILTON S. MEHR, *Examiner*.